(12) United States Patent
Woinski et al.

(10) Patent No.: US 9,616,619 B2
(45) Date of Patent: Apr. 11, 2017

(54) METHOD FOR PRODUCING A BOTTLE USING A MULTIFUNCTIONAL DETABBER APPARATUS

(71) Applicant: Graham Packaging Company, L.P., York, PA (US)

(72) Inventors: Grzegorz Woinski, Warsaw (PL); Slawomir Strupinski, Warsaw Mazowieckie (PL); Krzysztof Linka, Sulejowek (PL)

(73) Assignee: Graham Packaging Company, L.P., Lancaster, PA (US)

( * ) Notice: Subject to any disclaimer, the term of this patent is extended or adjusted under 35 U.S.C. 154(b) by 60 days.

(21) Appl. No.: 14/838,901

(22) Filed: Aug. 28, 2015

(65) Prior Publication Data

US 2015/0367570 A1 Dec. 24, 2015

Related U.S. Application Data

(62) Division of application No. 13/799,985, filed on Mar. 13, 2013, now Pat. No. 9,149,975.

(51) Int. Cl.
*B29C 67/00* (2006.01)
*B29C 53/02* (2006.01)
(Continued)

(52) U.S. Cl.
CPC .......... *B29C 67/0048* (2013.01); *B29C 37/02* (2013.01); *B29C 49/4273* (2013.01);
(Continued)

(58) Field of Classification Search
None
See application file for complete search history.

(56) References Cited

U.S. PATENT DOCUMENTS 3,606,113 A 9/1971 Lichtman
4,178,976 A * 12/1979 Weiler .................. A61J 1/05
215/377

(Continued)

FOREIGN PATENT DOCUMENTS

| EP | 0483671 | 5/1992 |
| FR | 2685198 | 6/1993 |
| JP | 07148829 | 6/1995 |

OTHER PUBLICATIONS

International Search Report dated Apr. 24, 2014 for International Application No. PCT/US2014/012917.
(Continued)

*Primary Examiner* — Monica Huson
(74) *Attorney, Agent, or Firm* — Stradley Ronon Stevens & Young, LLP

(57) ABSTRACT

A multifunctional detabber apparatus and method for producing bottles having a bottom surface with a hook projection integrally molded with and extending from the bottom surface in a deployed position. The bottom surface also includes at least one locking channel in order to receive and releasably secure the hook projection in a non-deployed position. The multifunctional detabber apparatus includes at least a grabber, a trimmer, and a hook closer. The grabber includes first and second jaws which surround the bottle and prevent movement. The trimmer includes first and second strikers for creating an outer periphery of the hook projection and an opening in the hook projection. The hook closer includes a mandrel that extends to bend and secure the hook projection in the locking channel in the bottom surface of the bottle.

20 Claims, 15 Drawing Sheets

(51) Int. Cl.
*B29C 49/42* (2006.01)
*B29C 49/72* (2006.01)
*B29C 49/50* (2006.01)
*B29C 37/02* (2006.01)
*B29C 69/00* (2006.01)
B29L 31/00 (2006.01)
B29C 49/04 (2006.01)
B29C 49/54 (2006.01)

(52) U.S. Cl.
CPC ............ *B29C 49/50* (2013.01); *B29C 49/72* (2013.01); *B29C 53/02* (2013.01); *B29C 69/001* (2013.01); B29B 2911/14513 (2013.01); B29C 49/04 (2013.01); B29C 49/541 (2013.01); B29C 2049/503 (2013.01); B29C 2793/009 (2013.01); B29C 2793/0009 (2013.01); B29L 2031/716 (2013.01); B29L 2031/7158 (2013.01); B29L 2031/738 (2013.01)

(56) References Cited

U.S. PATENT DOCUMENTS

| | | | |
|---|---|---|---|
| 4,282,980 A | 8/1981 | Winchell | |
| 4,395,378 A | 7/1983 | Alberghini et al. | |
| 5,409,749 A * | 4/1995 | Uehara | B29C 45/0055 215/399 |
| 5,540,579 A * | 7/1996 | Uehara | B29C 45/0055 425/528 |
| 6,341,684 B1 | 1/2002 | Kaminski | |
| D642,065 S | 7/2011 | Araujo et al. | |
| 2011/0240673 A1 | 10/2011 | Araujo et al. | |

OTHER PUBLICATIONS

OHIM Office for Harmonization in the Internal Market, Trade Marks and Designs—European Community Design No. 001758889-0001 dated Sep. 23, 2010 for a Container; Armel A. Archeny, David Araujo, Graham Packaging Company, L.P.

* cited by examiner

METHOD FOR PRODUCING A BOTTLE USING A MULTIFUNCTIONAL DETABBER APPARATUS

RELATED APPLICATION

This application claims the benefit of priority to U.S. application Ser. No. 13/799,985, filed on Mar. 13, 2013, the contents of which are incorporated in this application by reference.

TECHNICAL FIELD

The present invention relates generally to detabber apparatus and methods of trimming waste, forming a hook, and closing the hook in the bottom of bottles, containers, and like objects.

BACKGROUND OF THE INVENTION

When bottles, vessels, or like articles are manufactured, the bottles may need to undergo a number or series of process steps, such as molding, trimming, finishing, packaging, and the like to obtain the desired bottle design. The process steps may require a number of highly specialized types of equipment to perform individualized tasks. In other words, multiple single, specialized devices are required for each function leading to high capital expenditures and high operating costs.

With the introduction of bottles designed with a hook or hanger provided on the base of the bottle such that the bottle is able to be suspended or hung by its base, even more manufacturing steps may be required. Depending on the placement, type, and configuration of the hook, the hook may often be obtrusive or in the way. In particular, an extended hook on the bottom surface of the bottle can prevent the bottle from sitting upright on its base. Thus, bottles have been designed with an integrated hook, which is collapsible such that the hook can lie flush with the bottom of the bottle. This structure requires even further specialized equipment to provide a hook bending or closing function such that the hook is folded flush with the bottom of the bottle.

There remains a need, therefore, for a multifunctional machine, which is able to perform a number of different functions automatically, including forming an integrated hook and closing the hook against the bottom of the bottle in a fast, precise, and consistent manner.

SUMMARY OF THE INVENTION

To meet this and other needs, and in view of its purposes, the present invention provides for a space-saving, high-efficiency, automatic, multifunctional detabber apparatus that is able to handle and accurately perform a number of different functions in a single cycle. For example, the apparatus may achieve some or all of the following functions: (1) cutting, separating, or removing waste from the bottles (e.g., trimming waste from around a pre-molded hook projection); (2) forming hooks in the bottom of the bottles including creating the outer periphery of the hook and an opening in the hook; (3) folding or bending the hooks into a recess molded into the bottom of the bottles; (4) optimizing the flow of bottles; and (5) processing the bottles in a specific and reliable manner. The multifunctional detabber apparatus should be able to process up to about 40 bottles per minute.

In one embodiment, the present invention provides a multifunctional detabber apparatus for producing completed bottles in a single cycle. The bottle design is unique in that the bottle includes a main body portion and a bottom surface having a hook projection integrally molded with and extending from the bottom surface. Thus, in a deployed position, the hook projection can be used to hang the bottle in an upside-down configuration. The bottle further includes at least one locking channel molded into the bottom surface. The hook projection can be received within the locking channel to releasably secure the hook projection in a non-deployed position. In other words, the hook projection is folded or bent over and secured out of the way such that the bottle has a flat bottom and may be stood upright on the flat bottom. The bottle may weigh, when empty, about 8 grams to about 35 grams or more, for example.

Unlike traditional operations requiring a number of individual types of equipment or separate and discrete steps, the multifunctional detabber apparatus can incorporate a number of different tasks simultaneously or sequentially in a single cycle. The multifunctional detabber apparatus may include a grabber, a trimmer, and a hook closer in one cycle of the operations of the apparatus.

The grabber may include a first jaw and a second jaw adapted to at least partially surround the main body portion of the bottle and prevent movement of the bottle. The grabber stabilizes and prevents movement of the bottle during the subsequent trimming and hook-closing operations. The first and second jaws may each include a cavity contoured to receive a portion, for example, about half, of the main body portion of the bottle. In addition, either or both of the first and second jaws may be moveable to encase the bottles and inhibit movement. In one embodiment, the first jaw and the second jaw are aligned in parallel and are moveable relative to one another. The first jaw and the second jaw may further comprise bumpers to guide the first jaw and the second jaw around the bottle.

The trimmer may be designed as one or more strikers or punches to produce the final shape of the hook projection and remove excess molding waste. The trimmer may include a first striker and a second striker, for example. The first striker may include a sharp edge or cutting surface contoured to create an outer periphery of the hook projection and the second striker may include a sharp edge or cutting surface designed to create an opening or hole in the hook projection. The trimmer may further comprise a counter-striker juxtaposed to the first striker and the second striker to aid in trimming and supporting waste produced in the trimming or punching operation. In particular, the cutting surfaces of the first and second strikers may coincide with a surface of the counter-striker. If the waste is properly cut off or removed in upstream operations or by the first and second strikers, activation of the counter-striker may not be required.

The hook closer may be configured to bend or fold the hook projection and secure the hook projection in the locking channel in the bottom surface of the bottle. The hook closer may include a mandrel having an elongated shaft that extends in a linear fashion to contact the hook projection and fold the hook projection flush with the bottom surface of the bottle. This configuration results in a non-deployed position such that the hook projection is flush with the bottom surface of the bottle.

The first and second jaws, the first and second strikers, the counter-striker, and the mandrel may each be operated by a pneumatic servomotor, for example. In other words, a plurality of pneumatic servomotors may be connected to and operable for each of the first jaw, the second jaw, the first striker, the second striker, the counter-striker, and the mandrel. Depending on the type of bottle and conditions employed, the servomotors may apply a pressure of about 6-8 bar to the first and second jaws and the first and second strikers and a pressure of about 3-4 bar to the mandrel, for example.

According to another embodiment, the multifunctional detabber apparatus for producing a bottle in a single cycle includes a first moveable jaw and a second moveable jaw aligned in parallel and juxtaposed to the first moveable jaw, where both the first and second moveable jaws are adapted to at least partially surround the main body portion of the bottle and secure the bottle. The multifunctional detabber apparatus also includes a first moveable striker having a sharp edge adapted to create an outer periphery of the hook projection and remove excess flash or waste, a second moveable striker having a sharp edge adapted to create an opening or hole in the hook projection, and a moveable counter-striker. The first and second strikers may be positioned beneath the first moveable jaw and the moveable counter-striker may be positioned beneath the second moveable jaw. In addition, a moveable mandrel may be positioned between the second moveable jaw and the moveable counter-striker. The mandrel may have an elongated shaft that extends linearly to bend the hook projection and secure the hook projection in the at least one locking channel molded into the bottom surface of the bottle.

According to yet another embodiment, a method for producing a bottle in a single cycle may include:

(a) grabbing the bottle with a moveable first jaw and a moveable second jaw to secure the bottle and prevent movement;

(b) detabbing flash or waste from around an outer periphery of the hook projection with a first striker against a counter-striker;

(c) cutting an opening or a hole in the hook projection with a second striker against the counter-striker to create a hook;

(d) folding the hook projection flush with the bottom surface of the bottle and into the at least one locking channel in the bottom surface of the bottle with a mandrel having an elongated shaft; and (e) releasing the bottle from the first and second jaws.

Prior to grabbing the bottle, a plurality of bottles may be provided in a continuous stream from an upstream blow molding operation. After grabbing the bottle, the first and second moveable strikers may move simultaneously to punch the outer periphery of the hook projection and the opening in the hook projection and subsequently retract after trimming. Subsequent to detabbing and cutting the hole, the moveable mandrel may extend to fold the hook projection to secure the hook projection in the locking channel in the bottom surface of the bottle.

The multifunctional detabber apparatus is able to perform a number of different functions in a single-stage operation. The need for downstream operations, such as de-flashing, trimming, or hook closing, is made obsolete, which provides for performance efficiencies and cost savings in the overall operation. Accommodating multiple functions in one device minimizes losses and increases final efficiency versus multiple single, specialized devices for each function, which can potentially generate sum losses on each piece of equipment.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

The present invention provides for a high-efficiency multifunctional detabber apparatus able to handle and accurately modify a plurality of bottles. The apparatus is able to perform a number of different functions in a single cycle of the apparatus in a precise and consistent manner. The multifunctional detabber apparatus is able to incorporate functionality including trimming operations and folding or bending operations. The present invention also provides a related method for performing these functions.

Figure 1:
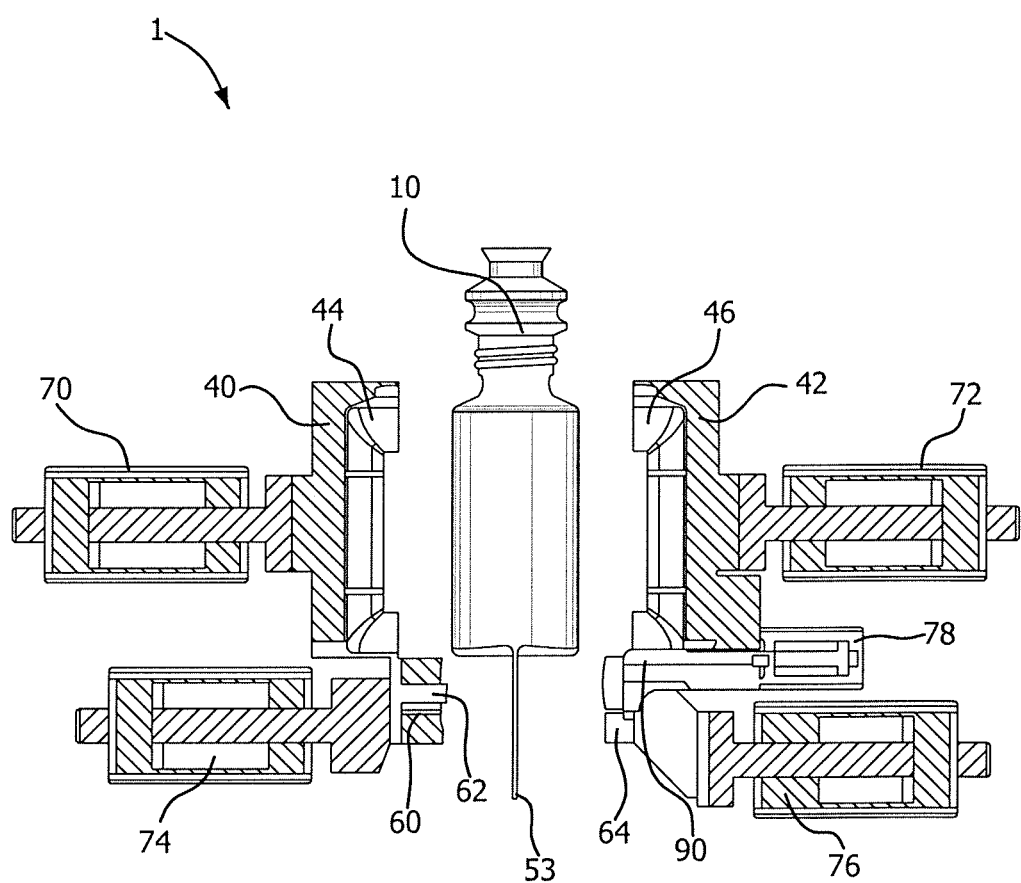
FIG. 1 shows a front view of a multifunctional detabber apparatus according to one embodiment of the present invention.
Figure 2A:
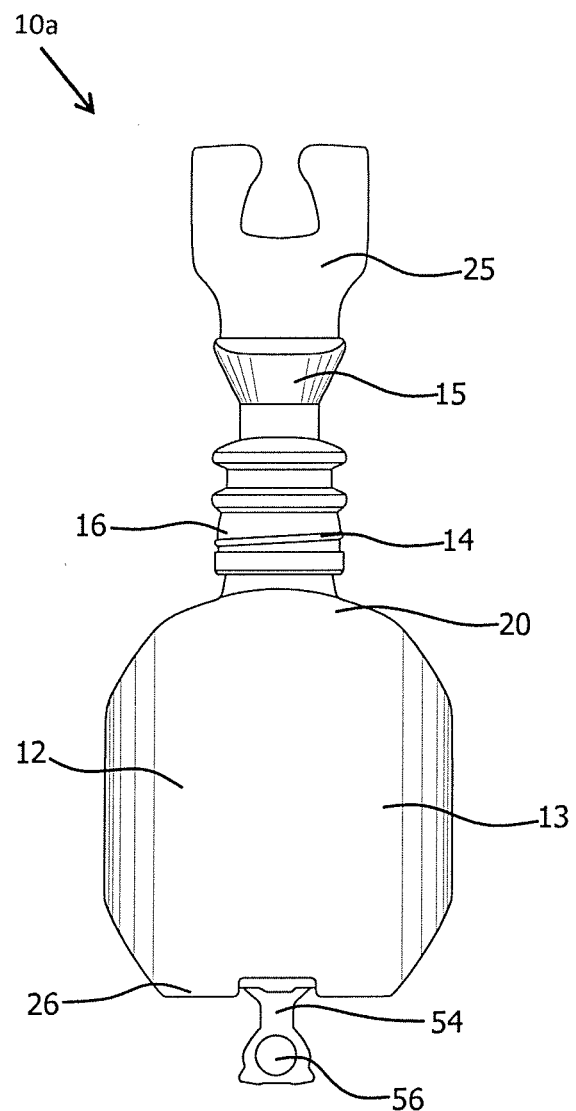
FIG. 2A shows a front view of one type of bottle suitable for use with the multifunctional detabber apparatus of the present invention.
Figure 2B:
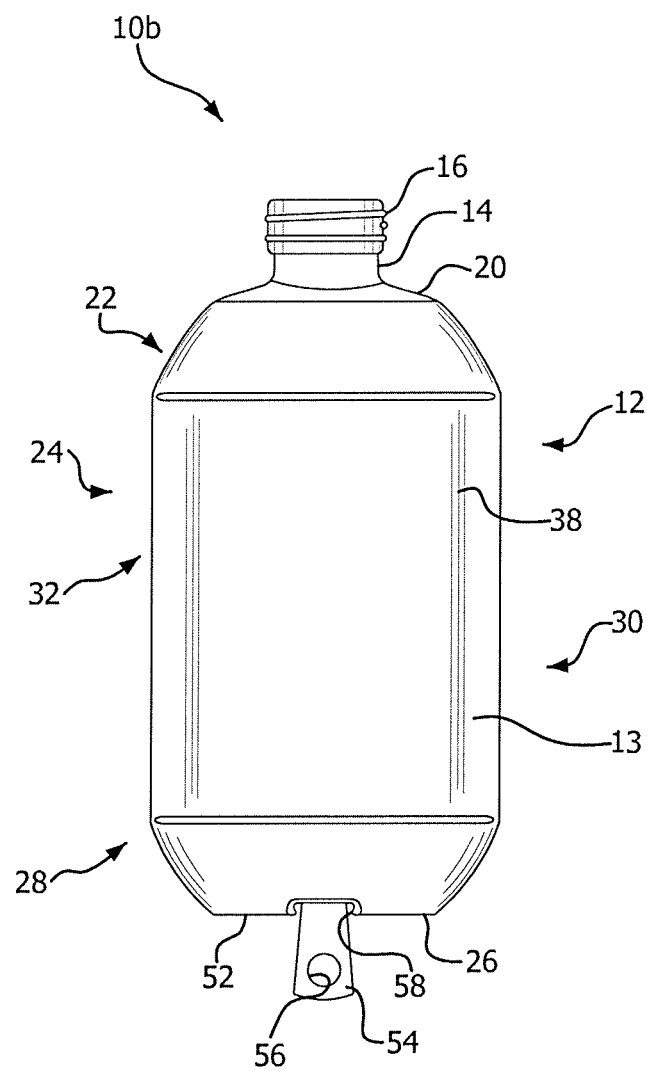
FIG. 2B shows a front view of another type of bottle suitable for use with the multifunctional detabber apparatus of the present invention.

Referring now to the drawing, in which like reference numbers refer to like elements throughout the various figures that comprise the drawing, the present invention provides a multifunctional detabber apparatus 1 for producing a single bottle 10 in a single cycle of operation of the multifunctional detabber apparatus 1. FIG. 1 depicts a multifunctional detabber apparatus 1 according to one embodiment of the present invention, which may be used to produce bottles 10 having an integral hook projection 54 (formed from a molded but uncut hook shape 53). FIGS. 2A and 2B depict examples of bottles 10a, 10b having a unique design with a hook projection 54 integrally molded with and extending from the bottom surface 26 of the bottle 10a, 10b when the hook projection 54 is in a deployed position 55a (as shown in FIG. 4).

The bottles 10 may be of any suitable size, shape, and design. For example, as depicted in FIGS. 2A and 2B, the bottle 10a, 10b may include a main body portion 12 having a sidewall 13 that defines an interior space having a given volume. By way of example only, the bottle size may range from about 500 ml to about 1,000 ml. The bottle 10a, 10b may further include a neck portion 14 that may have at least one external thread 16 for receiving a closure or a coupling, such as a cap (not shown). An opening may be defined in the neck portion 14 and may be in communication with the interior space of the bottle 10a, 10b. Depending on the design, the bottle 10a, 10b may include a tapered upper transition portion 22, an intermediate portion 24, and a tapered bottom transition portion 28. The main body portion 12, and specifically the intermediate portion 24, has a first side 30 and a second side 32. The tapered upper transition portion 22 may include an upper surface 20 that is unitary with the neck portion 14 and with the sidewall 13 of the main body portion 12.

Figure 3:
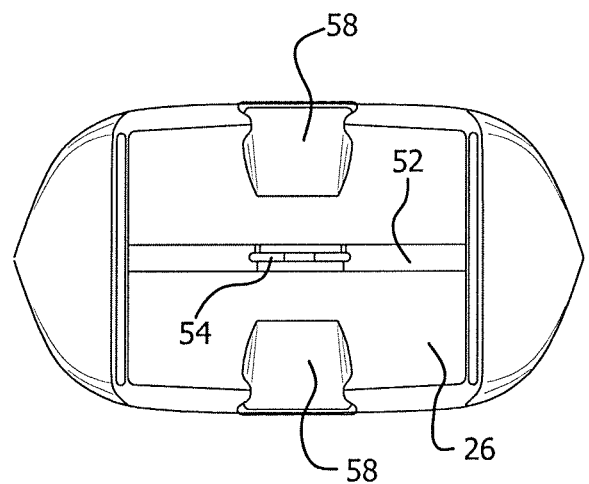
FIG. 3 shows a bottom view of the bottle shown in FIG. 2B.
Figure 4:
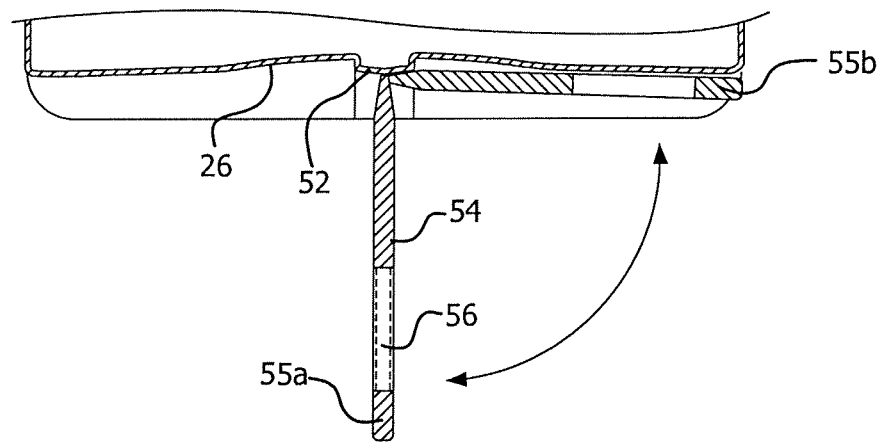
FIG. 4 shows a side view of the collapsible hook on the bottom of the bottle shown in FIG. 2B.

Referring to FIG. 4, the bottom surface 26 of the bottle 10a, 10b includes a mechanism for hanging the bottle 10a, 10b. For example, the hangable hook projection 54 may be attached to, integral with, and extending from the bottom surface 26 of the bottle 10a, 10b. A hole or opening 56 may be defined in the hook projection 54. In the alternative, a c-shaped, s-shaped, or similar design could be used instead of the hole 56. As depicted in FIG. 4, the hook projection 54 is preferably integrally molded with a central rib 52 that is defined in the bottom surface 26 of the bottle 10a, 10b. A pair of locking channels 58, best shown in FIG. 3, may also be molded into or contoured within the bottom surface 26 of the bottle 10a, 10b in order to receive and releasably secure the hook projection 54 in the non-deployed position 55b. The locking channels 58 may have a shape and surface area approximately equal to the shape and surface area of the hook projection 54. Thus, as seen in FIG. 4, in the deployed position 55a, the hook projection 54 can be used to hang the bottle 10a, 10b in an upside-down configuration or the hook projection 54 can be received within the locking channel 58 to releasably secure the hook projection 54 in a non-deployed position 55b. In other words, the hook projection 54 is folded or bent over and secured out of the way such that the bottle 10a, 10b has a substantially flat bottom surface 26 and may be stood upright on the flat bottom.

The bottles 10a, 10b may be obtained directly or indirectly from an upstream operation (not shown), such as a blow molding process known to one of ordinary skill in the art. The upstream operation may include blow molding hollow bottles 10 or other similar containers. In particular, plastic blow molded bottles 10 may be discharged from blow molds (not shown) and transported to the location of the multifunctional detabber apparatus 1. Although bottles 10a, 10b are exemplified in this document, it is envisioned that the multifunctional detabber apparatus 1 can be used with any type of bottle 10 or discrete article having any size, shape, and dimension including containers, vessels, flasks, vials, or the like known in the art.

Due to the blow molding process, excess material or waste may be affixed to the formed bottle 10. For example, excess molding waste 38 (see FIG. 5) may remain around the molded but uncut hook 53. It is also contemplated that a tail 25 (see FIG. 2A) from the next bottle 10 in production may remain on the top or bottom areas of the bottle 10 or a dome 15 may remain above the neck portion 14 of the bottle 10. In some cases, two or more bottles 10 may be joined together, for example, where each bottle 10 is attached to the other at the neck portion 14, and the bottles 10 need to be separated from one another (not shown). Thus, the bottles 10 may need to undergo a de-flashing, trimming, cutting, or separating process, for example, to trim the tail 25, remove the dome 15, and the like.

The bottles 10 may be termed lightweight bottles 10 where "lightweight" is intended to denote an article weighing relatively little and as compared to a heavier article. Primarily, this distinction is made with reference to bottles 10 or containers which are empty or not filled. Thus, a bottle 10 which is empty is lightweight as compared to a similar bottle 10 which is filled (e.g., with a liquid or the like). It will be appreciated by one of ordinary skill in the art, however, that the weight of a bottle 10 may vary depending on the nature of the materials used to make the bottle 10 (e.g., plastic vs. glass), the shape and design of the bottle 10, the size or volume of the bottle 10, and the like. In an exemplary embodiment, the bottles 10 are lightweight bottles 10 or containers, which are hollow or empty. For example, the hollow or empty bottles 10 may be plastic bottles 10 formed from an upstream blow molding operation. The lightweight, empty bottles 10 may weigh up to about 35 grams, about 8 grams to about 35 grams, about 10 grams to about 30 grams, or about 12 to about 18 grams, for example. As will be recognized by one of ordinary skill in the art, the weight of the bottle 10 may also vary depending on the type and amount of scrap or waste material adhered to the bottle 10.

Figure 5:
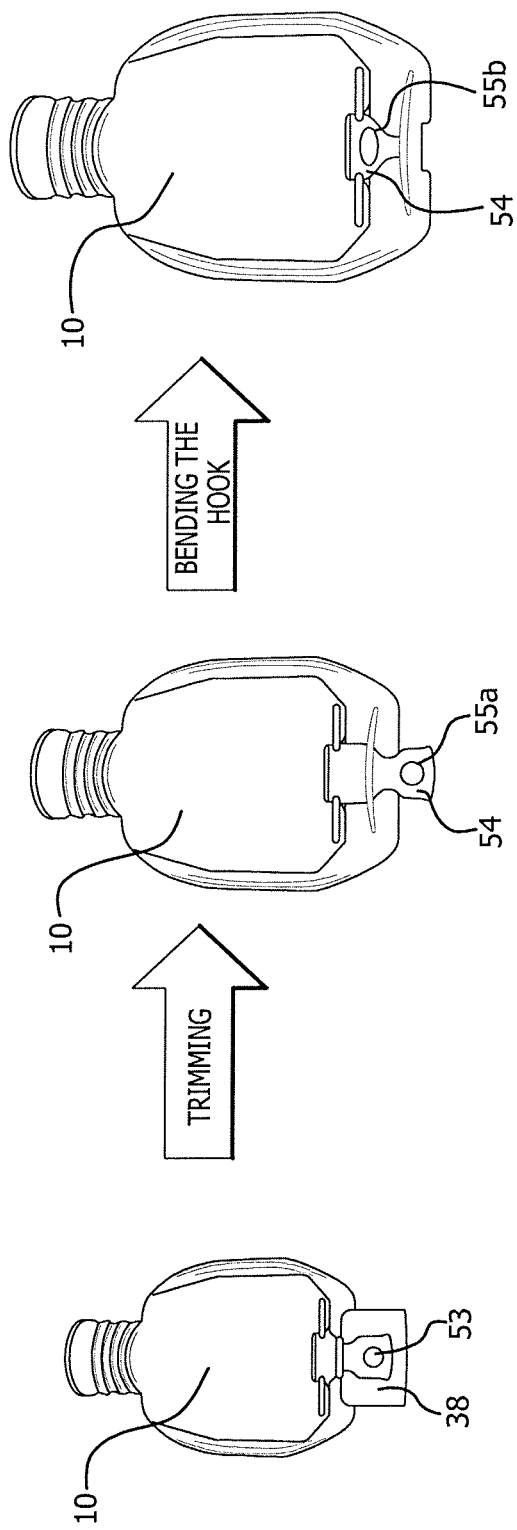
FIG. 5 depicts the steps used to obtain a desired configuration of the bottle according to one embodiment of the invention.

Referring now to FIGS. 5 and 7-10, in order to cut out the shape of the hook projection 54 and fold and secure the hook projection 54 in the locking channel 58, the multifunctional detabber apparatus 1 may include a grabbing function, a trimming function, and a hook-closing function in one single cycle of operation of the multifunctional detabber apparatus 1. Thus, unlike traditional manufacturing processes requiring a number of individual types of equipment or separate and discrete steps, the multifunctional detabber apparatus 1 can incorporate a number of different tasks simultaneously or sequentially in a single cycle. As shown in FIG. 5, the bottle 10 may undergo the following steps. First, the bottle 10 is formed, for example, by blow molding to produce a bottle with an uncut hook 53 surrounded by excess molding waste 38. Next, the bottle 10 is trimmed to remove the excess waste 38 and create the hook projection 54 in the deployed position 55a. Subsequently, the hook projection 54 may be bent and secured in the non-deployed position 55b. FIGS. 7-10 sequentially show the respective positions of the multifunctional detabber apparatus 1 to perform each of these steps and are described in more detail below.

Figure 7:
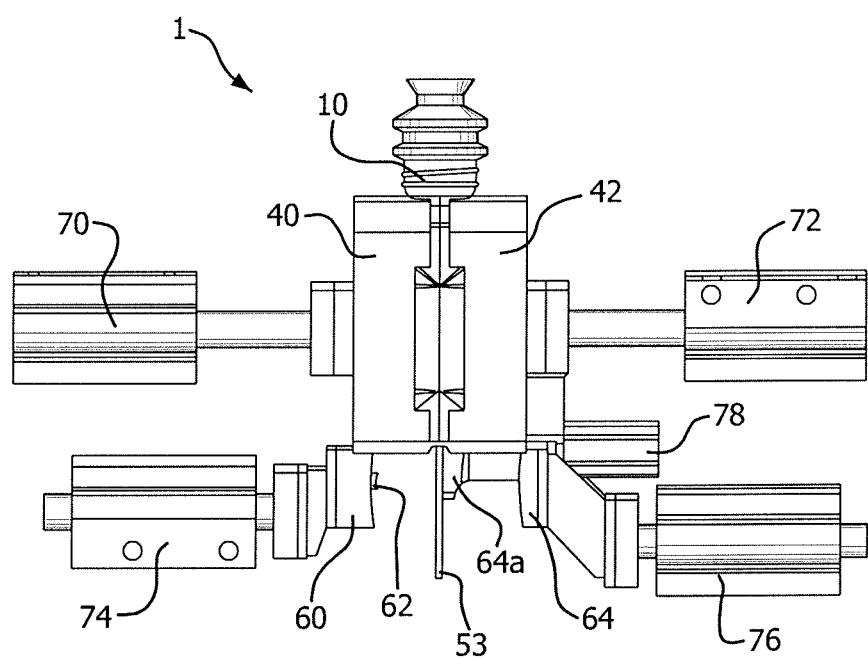
FIG. 7 shows the front view of the multifunctional detabber apparatus shown in FIG. 1 with the first and second jaws engaging and surrounding the main body portion of the bottle.
Figure 12:
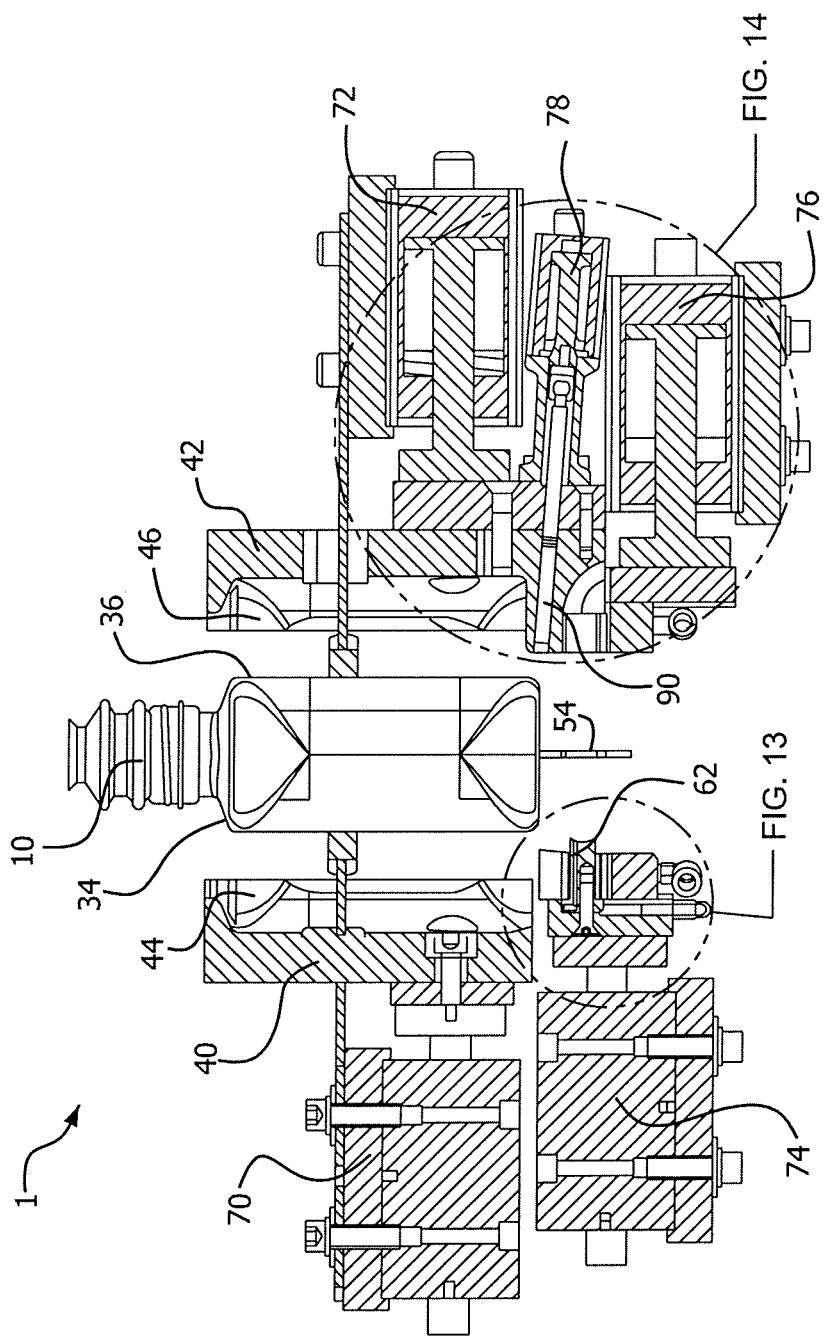
FIG. 12 shows a schematic front view of one embodiment of the multifunctional detabber apparatus.

Referring to FIG. 7, the multifunctional detabber apparatus 1 may include a grabber comprised of a first jaw 40 and a second jaw 42 adapted to at least partially surround the main body portion 12 of the bottle 10 and prevent movement of the bottle 10. As shown in FIG. 7, the first and second jaws 40, 42 move inwardly to surround the bottle 10 such that the uncut hook 53 protrudes below the first and second jaws 40, 42. The grabber stabilizes and prevents movement of the bottle 10 during the subsequent trimming and hook-closing operations. FIG. 1 shows that the first and second jaws 40, 42 may each include a cavity 44, 46, respectively, contoured to receive a portion, for example, about half, of the main body portion 12 of the bottle 10. As best seen in FIG. 12, the bottle 10 includes a first face 34 and a second face 36. The contours of the first cavity 44 in the first jaw 40 may be shaped and sized so as to receive a portion of or substantially all of the first face 34 of the bottle 10. Similarly, the contours of the second cavity 46 in the second jaw 42 may be shaped and sized so as to receive a portion of or substantially all of the second face 36 of the bottle. Although specifically designed cavities 44, 46 are depicted to substantially encase the first and second faces 34, 36 of the bottle 10, it is envisioned that any suitable design and configuration may be employed for the first and second jaws 40, 42 so long as the bottle 10 is secured and movement of the bottle 10 is prohibited.

Referring to the movement from FIG. 1 to FIG. 7, either or both of the first and second jaws 40, 42 may be moveable to encase the bottle 10 and inhibit movement. In other words, one of the first and second jaws 40, 42 may be stationary. In an exemplary embodiment, both of the first and second jaws 40, 42 are moveable in a linear fashion to surround the bottle 10. For example, the first jaw 40 and the second jaw 42 may be aligned in parallel and moveable relative to one another. The second jaw 42 may be aligned in parallel and juxtaposed to the first moveable jaw 40.

Figure 6:
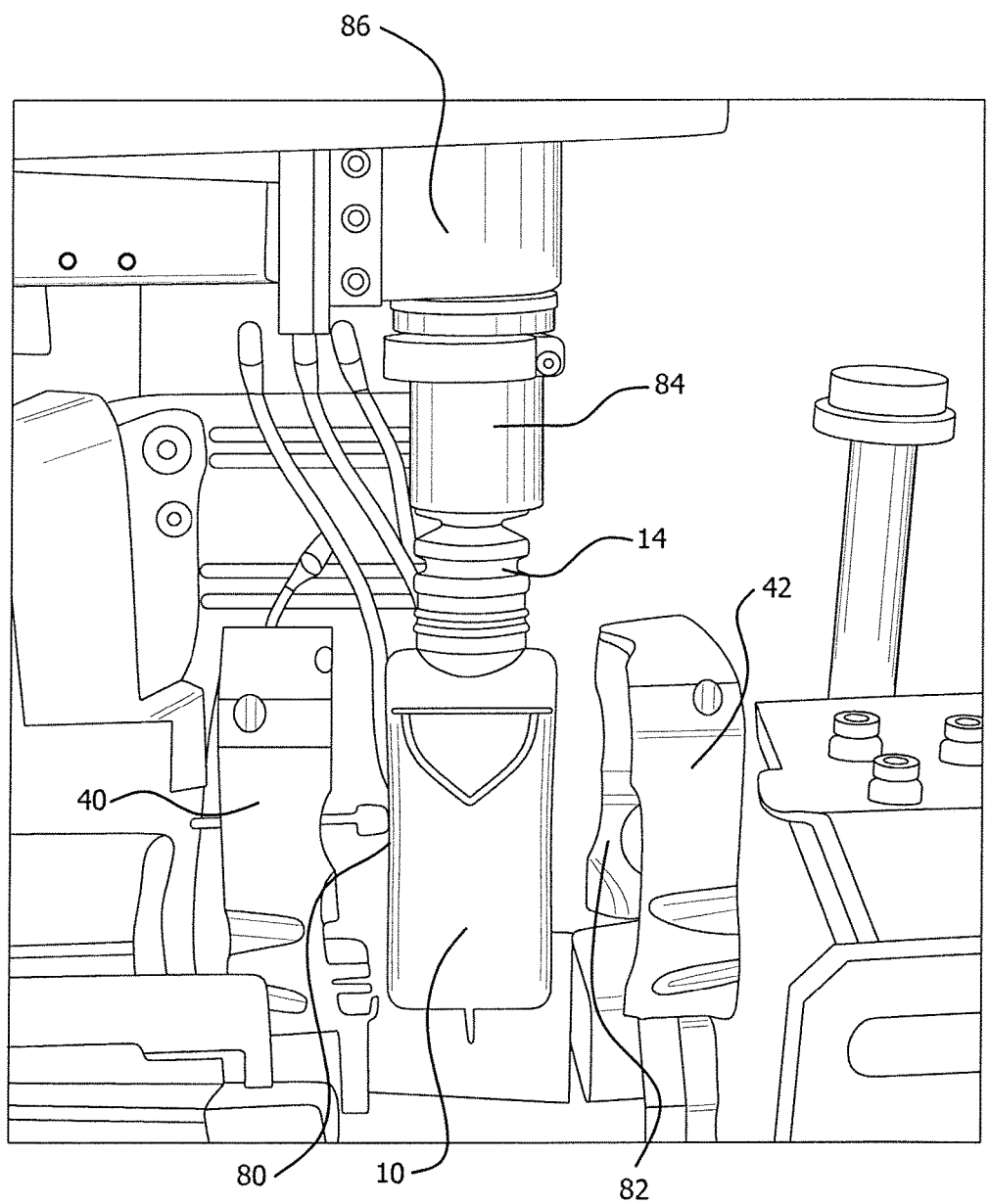
FIG. 6 depicts placement of the bottle between first and second jaws of a multifunctional detabber apparatus.
Figure 15:
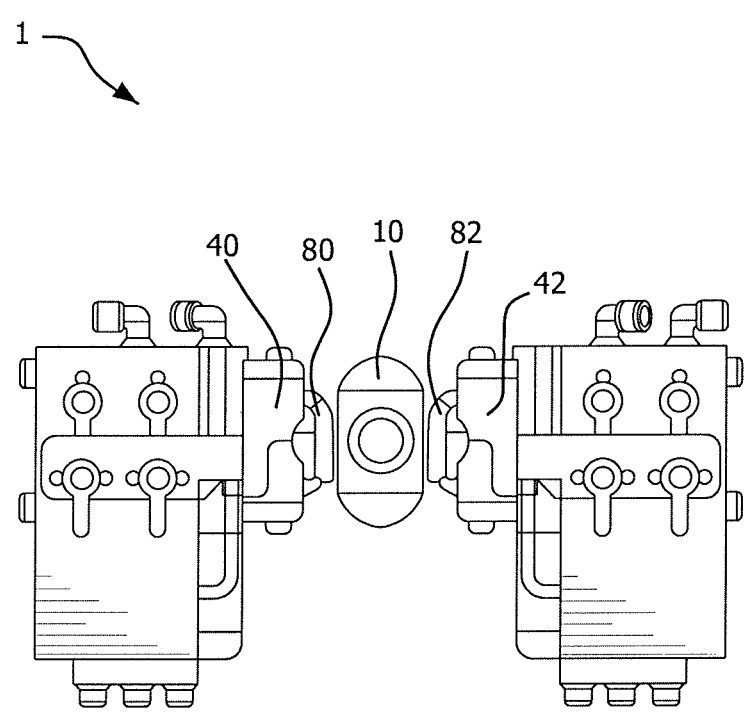
FIG. 15 shows a top view of the multifunctional detabber apparatus shown in FIG. 12.

As best seen in FIGS. 6 and 12, the first jaw 40 and the second jaw 42 may further comprise first and second bumpers 80, 82, respectively, to guide the first jaw 40 and the second jaw 42 around the bottle 10. For example, the first jaw 40 may include the first bumper 80 which extends from a central portion of the cavity 44 to ensure positioning of the first face 34 of the bottle 10 and guide the first jaw 40 into position (as shown in FIG. 12). Similarly, the second jaw 42 may include the second bumper 82 which extends from a central portion of the cavity 46 to ensure positioning of the second face 36 of the bottle 10 and guide the second jaw 42 into position. The first and second bumpers 80, 82 may be of any suitable size, shape, and design. For example, the first and second bumpers 80, 82 may be comprised of bars adapted to contact the first and second faces 34, 36 of the bottle 10. FIG. 15 depicts a top view of the multifunctional detabber apparatus 1 including one suitable pair of bumpers 80, 82.

Figure 8:
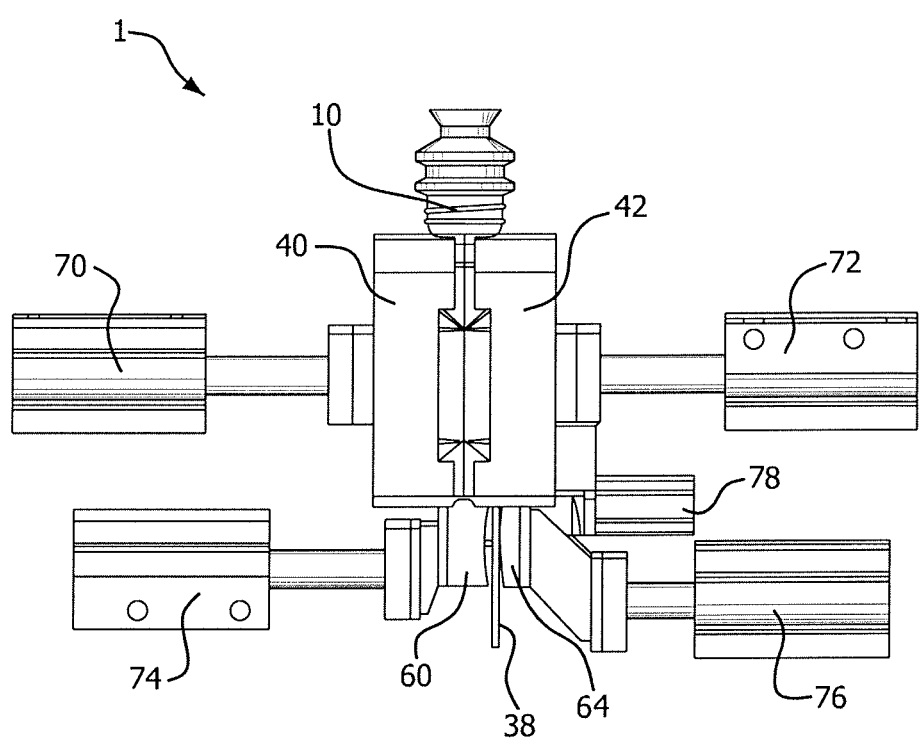
FIG. 8 shows the front view of the multifunctional detabber apparatus shown in FIG. 7 with first and second strikers creating an outer periphery of the hook projection and an opening in the hook projection, respectively.

Referring now to FIG. 8, the multifunctional detabber apparatus 1 may include one or more trimmers. The multifunctional detabber apparatus 1 is able to remove excess waste 38 from the bottles 10 remaining from the manufacturing process. In particular, the trimmer may be designed as one or more strikers or punches to produce the final shape of the hook projection 54 and remove the excess molding waste 38 from around the periphery of the hook projection 54. For example, when the bottle 10 is formed by a blow molding process, excess blow molding material, flash, or waste may remain affixed to or on the surface of the bottle 10. FIGS. 2A and 2B depict two types of bottles 10a, 10b that may be produced through blow molding. For example, bottles 10a, 10b may be manufactured by extruding a parison of plastic material, capturing a portion of the parison within a mold, and inflating the portion of the parison that is within the mold against the walls of the mold to fabricate the specific shape of the container desired. The bottle 10a, 10b may be designed to be rigid or collapsible. Although bottles 10a, 10b are exemplified in this document, it is envisioned that any type of bottle (e.g., cylindrical) having any size and dimensions known in the art may be produced. Also, any suitable types of manufacturing processes including other types of molding processes could be used to produce the bottles 10.

Figure 13:
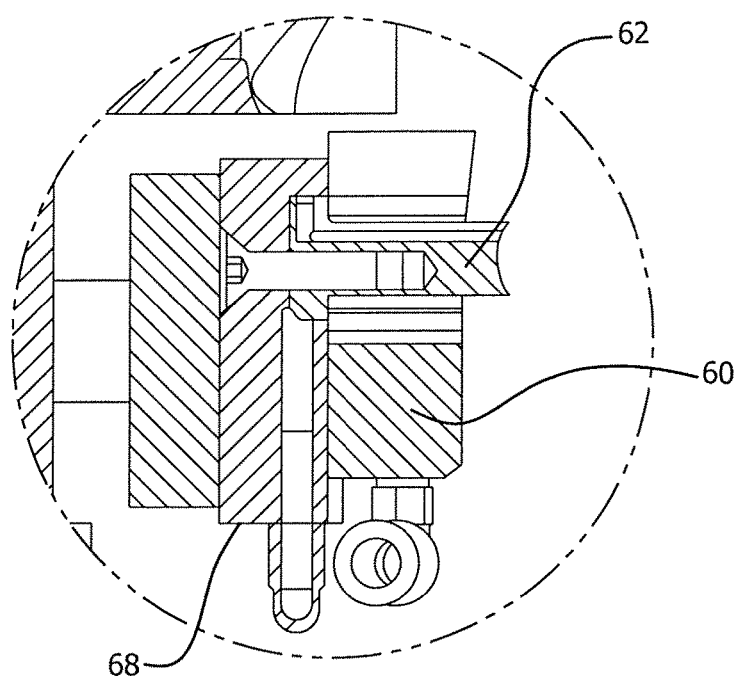
FIG. 13 provides a close-up view of the first and second strikers shown in FIG. 12.

As shown in FIG. 8, the trimmer may include a first striker 60 and a second striker 62, for example. After the first and second jaws 40, 42 are and remain engaged around the bottle 10, the first and second strikers 60, 62 are triggered, either simultaneously or sequentially. The first striker 60 may include a sharp edge or cutting surface contoured to create an outer periphery of the hook projection 54. Although two designs for the hook projection 54 are depicted in FIGS. 2A and 2B, the shape and design of the hook projection 54 and hence the shape of the first striker 60 is not especially limited, but may be of any suitable design and configuration. In addition, the design of the hook projection 54 may already be molded into the form of the bottle 10 such that the first striker 60 only needs to remove the pre-perforated excess waste 38. The excess waste 38 may exit the multifunctional detabber apparatus 1 via gravity, for example, through a chute or the like. The second striker 62 may include a sharp edge or cutting surface designed to create the hole or opening 56 in the hook projection 54. FIG. 13 provides a close-up, cross-sectional view of the multifunctional detabber apparatus shown in FIG. 12 including the first striker 60 for creating the outer periphery of the hook projection 54, the second striker 62 for forming the hole or opening 56 in the hook projection 54, and a striker plate 68, which supports the first and second strikers 60, 62. The multifunctional detabber apparatus 1 may include any suitable number and design of strikers or punches known to those skilled in the art necessary to create the desired hook projection 54.

Figure 9:
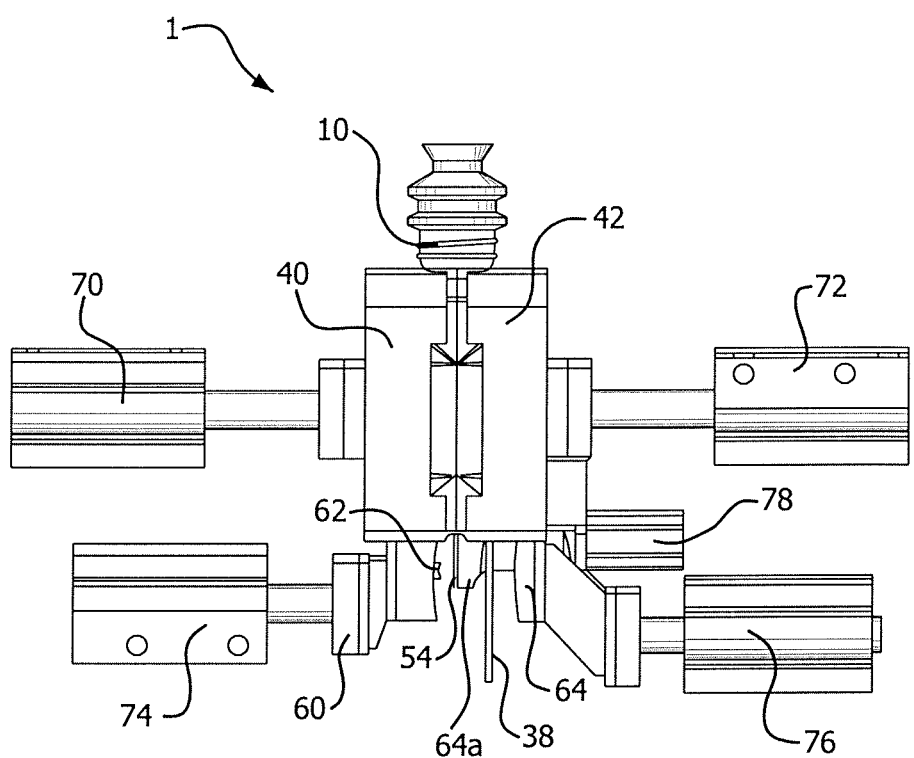
FIG. 9 depicts the front view of the multifunctional detabber apparatus shown in FIG. 8 with the first and second strikers retracting and the excess waste separated from the hook projection.

Referring to FIGS. 8 and 9, the trimmer may further comprise a counter-striker 64 juxtaposed to the first striker 60 and the second striker 62 to aid in trimming and supporting waste produced in the trimming or punching operation. In particular, the cutting surfaces of the first and second strikers 60, 62 may coincide with at least one surface of the counter-striker 64. The counter-striker 64 may be composed of two parts. The primary portion of the counter-striker 64 may be used to support the entire uncut hook 53. A secondary portion 64a of the counter-striker 64 may be used to support the hook projection 54, the area punched to form the hole 56, or a portion of these. As shown in FIG. 7, the secondary portion 64a of the counter-striker 64 may be synchronized to move simultaneously with the second jaw 42 in order to support the hook projection 54 prior to trimming.

Subsequently, as depicted in FIG. 8, the primary portion of the counter-striker 64 may be engaged to provide counter pressure to the first and second strikers 60, 62. As depicted in FIG. 8, the force of the first and second strikers 60, 62 may cause the counter-striker 64 to retract. As shown in FIG. 9, after trimming, each of the first and second strikers 60, 62 and the counter-striker 64 may retract to allow the molding waste 38 to drop away. The secondary portion 64a of the counter-striker 64 may remain engaged and in position to support the newly formed hook projection 54. If the molding waste 38 is properly cut off or removed in upstream operations or by the first and second strikers 60, 62, activation of the counter-striker 64 may not be required.

As shown in FIG. 9, the first and second strikers 60, 62 and the counter-striker 64 should be positioned beneath the bottom surface 26 of the bottle 10 in order to access the uncut hook 53 on the bottom surface 26 of the bottle 10. The first and second strikers 60, 62 may be positioned beneath the first moveable jaw 40. The moveable counter-striker 64 (and secondary portion 64a of the counter-striker 64) may be positioned beneath the second moveable jaw 42.

Figure 10:
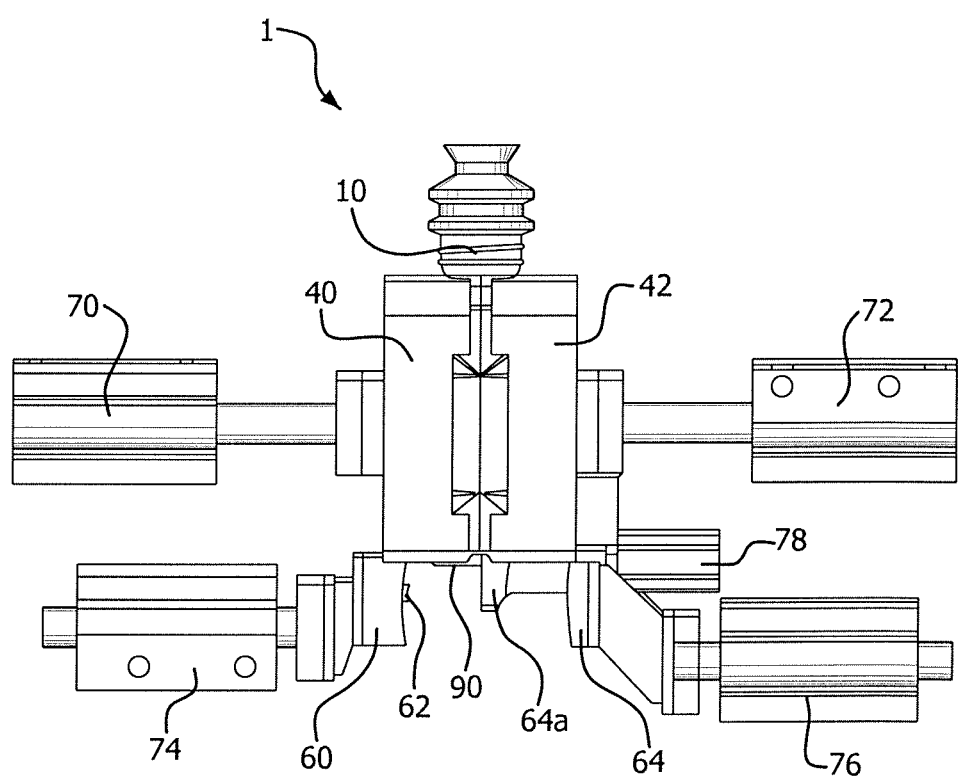
FIG. 10 depicts the front view of the multifunctional detabber apparatus shown in FIG. 9 with the mandrel extended to bend and secure the hook projection into the locking channel in the bottom surface of the bottle.
Figure 11:
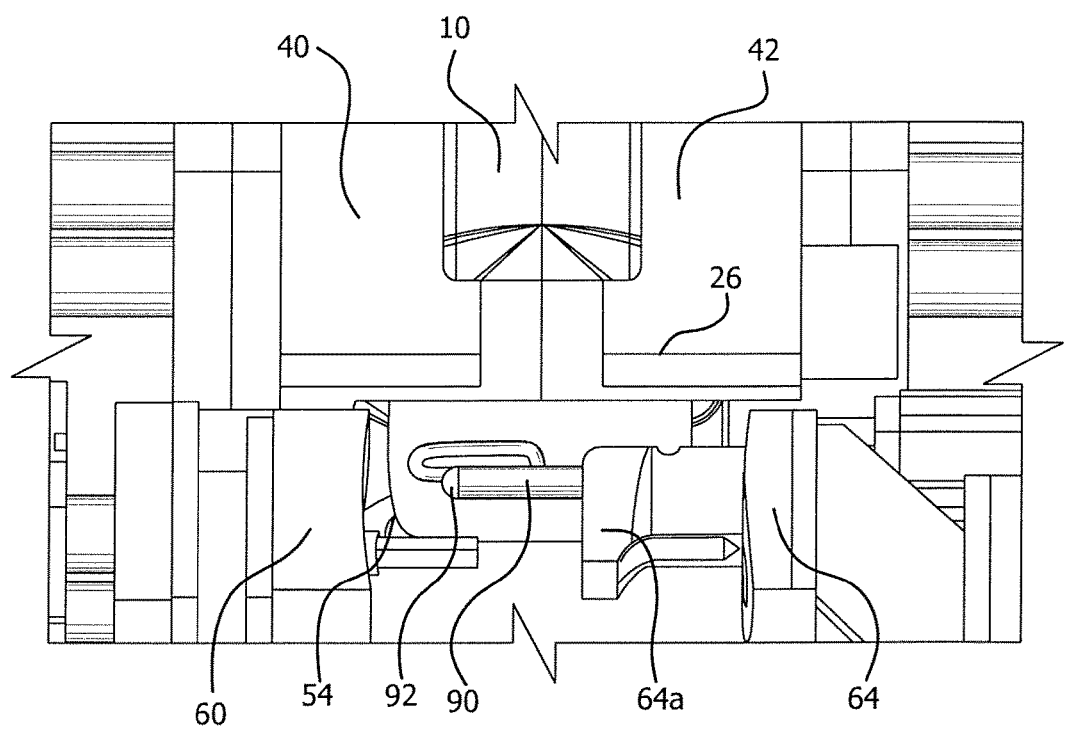
FIG. 11 shows a close-up perspective view of the extended mandrel and closed hook projection.

Referring now to FIGS. 10 and 11, the multifunctional detabber apparatus 1 may include a hook closer configured to bend or fold the hook projection 54 and secure the hook projection 54 in the locking channel 58 in the bottom surface 26 of the bottle 10. In other words, the hook closer may be provided to bend or maneuver the hanging hook projection 54 into the non-deployed position 55b (e.g., recessed into one of the locking channels 58) as shown in FIG. 4. The bottle 10 may be produced with the hanging hook projection 54 in the extended or deployed position 55a. In order to meet the demands of downstream processing and to orient the bottles 10 in an upright and vertical orientation, the hanging hook projection 54 can be bent or moved to the non-deployed position 55b.

Figure 14:
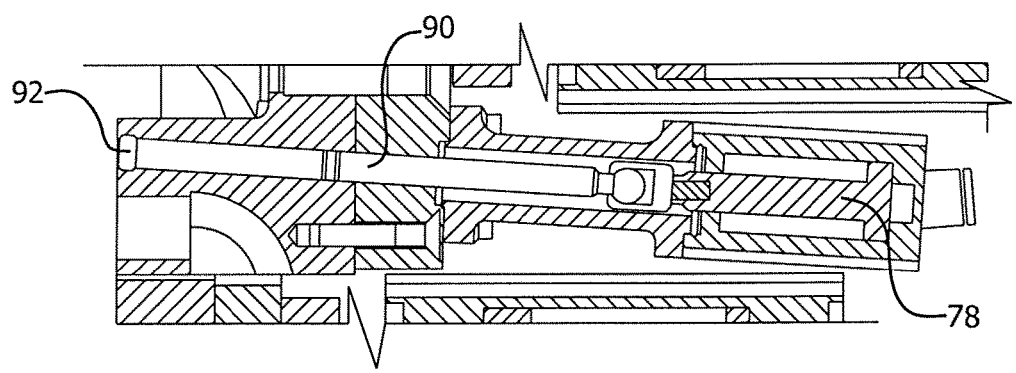
FIG. 14 provides a close-up view of the retracted mandrel shown in FIG. 12.

As shown in FIGS. 10 and 11, after the first and second strikers 60, 62 and the primary counter-striker 64 retract, a mandrel 90 may extend from the secondary portion 64a of the counter-striker 64. The hook closer may include the mandrel 90 having an elongated shaft that extends to contact the hook projection 54. As best seen in the close-up of FIG. 11, the mandrel 90 having a first end 92 may be positioned in parallel with and proximate to the bottom surface 26 of the bottle 10 such that when the first end 92 of the mandrel 90 extends, the first end 92 contacts one side of the hook projection 54. The first end 92 of the mandrel 90 may be rounded or semi-spherical, for example. The mandrel 90 may extend linearly to contact the hook projection 54 and fold the hook projection 54 flush with (or recessed into) the bottom surface 26 of the bottle 10. This configuration produces the non-deployed position 55b such that the hook projection 54 is substantially flush with the bottom surface 26 of the bottle 10. FIG. 14 provides a close-up, cross-sectional view of the multifunctional detabber apparatus 1 shown in FIG. 12 including the mandrel 90 in a retracted position. The mandrel 90 may be positioned proximate to and beneath the bottom surface 26 of the bottle 10 to access the hook projection 54 once formed. For example, the moveable mandrel 90 may be positioned between the second moveable jaw 42 and the moveable counter-striker 64.

As shown in FIGS. 7-10, the first and second jaws 40, 42; the first and second strikers 60, 62; the counter-striker 64; and the mandrel 90 may each be operated by any suitable equipment or device known in the art, such as by electric, hydraulic, or pneumatic motors or actuators. In an exemplary embodiment, the first and second jaws 40, 42; the first and second strikers 60, 62; the counter-striker 64; and the mandrel 90 may be operated by a plurality of pneumatic servomotors, for example. In particular, a pneumatic servomotor 70 may be connected to and operable for the first jaw 40; a pneumatic servomotor 72 may be connected to and operable for the second jaw 42; a pneumatic servomotor 74 may be connected to and operable for the first striker 60 and the second striker 62; a pneumatic servomotor 76 may be connected to and operable for the counter-striker 64; and a pneumatic servomotor 78 may be connected to and operable for the mandrel 90. The pneumatic servomotors 70, 72, 74, 76, and 78 are preferably linear servomotors, which provide linear motion to each of the first and second jaws 40, 42; the first and second strikers 60, 62; the counter-striker 64; and the mandrel 90. The pneumatic servomotors 70, 72, 74, 76, and 78 may be operated under standard conditions known in the art. For example, the servomotors 70, 72, 74, 76, and 78 may apply a pressure up to about 10 bar, preferably about 3-8 bar. In particular, the servomotors 70, 72, 74, and 76 may apply a pressure of about 6-8 bar to the first and second jaws 40, 42 and the first and second strikers 60, 62. The servomotor 78 may also apply a pressure of about 3-4 bar to the mandrel 90, for example.

According to another embodiment, a method for producing the bottle 10 in a single cycle may include:

(a) grabbing the bottle 10 with the moveable first jaw 40 and the moveable second jaw 42 to secure the bottle 10 and prevent movement (see FIG. 7);

(b) detabbing flash or excess waste 38 from around an outer periphery of the hook projection 54 with the first striker 60 against the counter-striker 64 (see FIG. 8) and retracting the first striker 60 after detabbing (see FIG. 9);

(c) cutting the hole or opening 56 in the hook projection 54 with the second striker 62 against the counter-striker 64 to create the hook (see FIG. 8) and retracting the second striker 62 after cutting the hole (see FIG. 9);

(d) folding the hook projection 54 flush with the bottom surface 26 of the bottle 10 and into the at least one locking channel 58 in the bottom surface 26 of the bottle 10 with the mandrel 90 having an elongated shaft (see FIG. 10); and (e) releasing the bottle 10 from the first and second jaws 40, 42 (see FIG. 1).

Prior to grabbing the bottle 10, as shown in FIG. 7, a plurality of bottles 10 may be provided in a continuous stream from an upstream blow molding operation. As best seen in FIG. 6, the bottles 10 may be transported to the multifunctional detabber apparatus 1 using a claw head 84 on a spider tool 86. The claw head 84 is adapted to grab the neck portion 14 of the bottle 10, for example, using a mechanical grabber or a vacuum source (not shown), and the spider tool 86 includes an arm able to transport the bottle 10 seamlessly from an upstream operation, such as blow molding, and align the bottle 10 in between the first and second jaws 40, 42. In the alternative, the bottles 10 may be conveyed to and from the multifunctional detabber apparatus 1, for example, using a conveyor, such as a cleated conveyor, a flat belt conveyor, fan belt conveyor, or similar endless conveyance apparatus.

As depicted in FIGS. 7-10, after the first and second jaws 40, 42 grab the bottle 10, the first and second moveable strikers 60, 62 may move simultaneously to punch the outer periphery of the hook projection 54 and the opening 56 in the hook projection 54 and subsequently retract after trimming. Subsequent to detabbing and cutting the hole or opening 56, the moveable mandrel 90 may extend to fold the hook projection 54 into the locking channel 58. The moveable mandrel 90 may subsequently retract to allow the bottle 10 to be released by the first and second jaws 40, 42.

Figure 16:
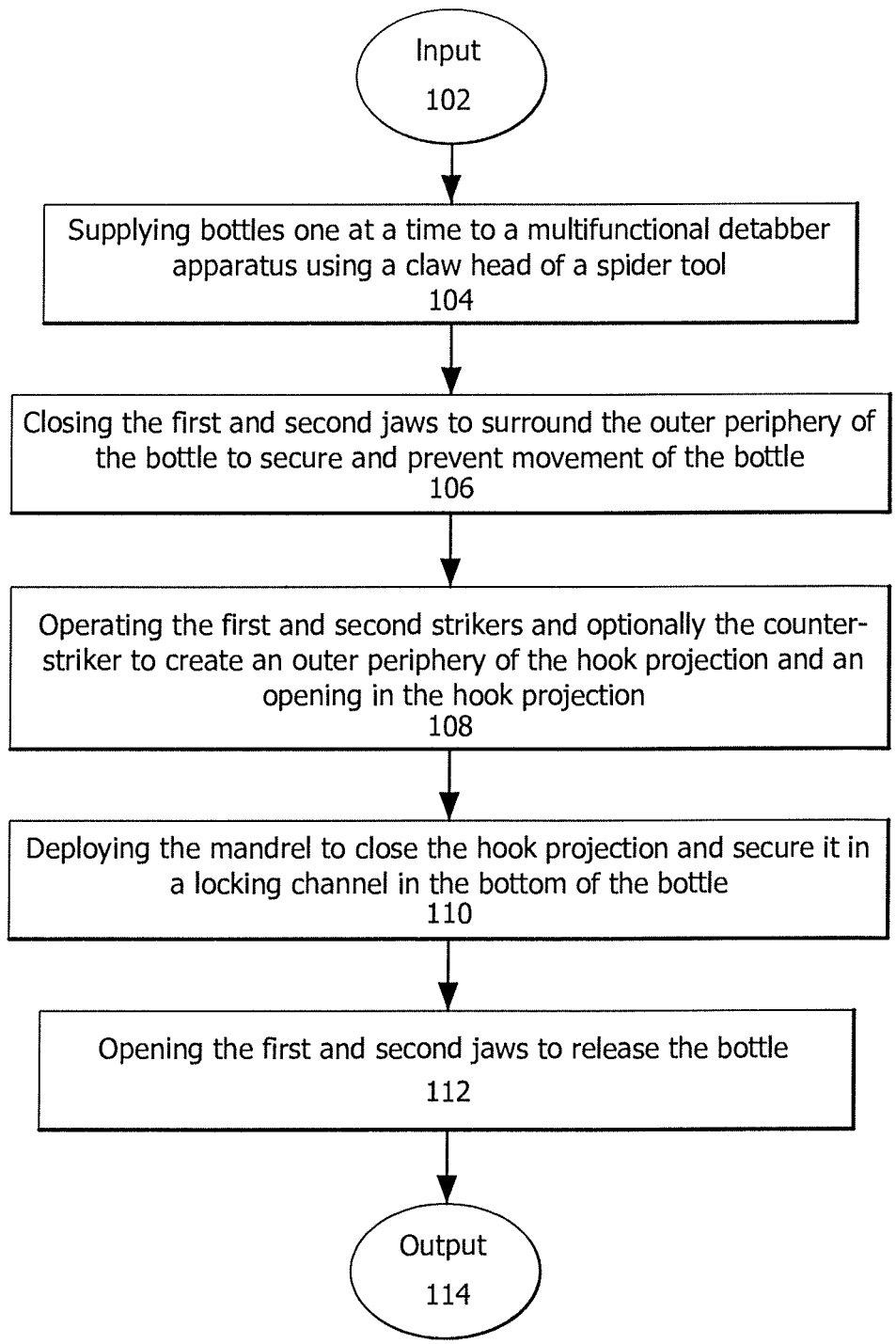
FIG. 16 depicts a flow chart demonstrating an algorithm suitable for use with the present invention.

FIG. 16 provides a flow chart summarizing the steps that may be performed in obtaining a bottle 10 in a single cycle of the multifunctional detabber apparatus 1. The multifunctional detabber apparatus 1 may be able to process up to about 40 bottles per minute. First, the bottles 10 are input at step 102 from one or more upstream operations. The bottles 10 are then supplied one at a time, at step 104, to the multifunctional detabber apparatus 1, for example, using the claw head 84 of the spider tool 86. Next, at step 106, the first and second jaws 40, 42 are closed to surround an outer periphery of the bottle 10 and secure and prevent movement of the bottle 10 during subsequent operations. Next, at step 108, the first and second strikers 60, 62 are operated and optionally, the counter-striker 64 is operated, to create an outer periphery of the hook projection 54 and an opening 56 in the hook projection 54. Preferably, the first and second strikers 60, 62 are operated simultaneously. Next, at step 110, the mandrel 90 is deployed to close the hook projection 54 and secure the hook projection 54 in the locking channel 58 previously molded into the bottom surface 26 of the bottle 10 in an upstream operation. Lastly, at step 112, the first and second jaws 40, 42 are opened to release the bottle 10, and the bottle 10 is output at step 114 to one or more downstream operations. Thus, instead of having to use separate and multiple downstream devices, the multifunctional detabber apparatus 1 is able to sequentially or simultaneously incorporate multiple functionality, such as trimming, folding, and the like, in order to shorten the production line and remove costly downstream devices.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods of using the various devices disclosed above are not restricted to any particular order. In addition, features of one embodiment may be incorporated into another embodiment.

What is claimed is:

1. A method for producing a bottle in a single cycle, the bottle having a main body portion and a bottom surface having a hook projection integrally molded with and extending from the bottom surface in a deployed position and at least one locking channel molded into the bottom surface in order to receive and releasably secure the hook projection in a non-deployed position, the method comprising:
    grabbing the bottle with a moveable first jaw and a moveable second jaw to secure the bottle and prevent movement of the bottle;
    detabbing flash from around an outer periphery of the hook projection with a first striker against a counter-striker;
    cutting a hole in the hook projection with a second striker against the counter-striker to create a hook;
    folding the hook flush with the bottom surface of the bottle and into the at least one locking channel in the bottom surface of the bottle with a mandrel having an elongated shaft; and
    releasing the bottle from the first and second jaws.

2. The method of claim 1, wherein the first and second strikers move simultaneously to punch the outer periphery of the hook projection and the opening in the hook projection.

3. The method of claim 2, wherein subsequent to detabbing and cutting the hole, the mandrel extends to fold the hook into the at least one locking channel.

4. The method of claim 1, wherein, prior to grabbing the bottle, a plurality of bottles are provided in a continuous stream from an upstream operation.

5. The method of claim 1 further comprising operating each of the first jaw, the second jaw, the first striker, the second striker, and the mandrel using a plurality of pneumatic servomotors.

6. The method of claim 5, wherein the servomotors apply a pressure of about 6-8 bar to the first and second jaws and the first and second strikers.

7. The method of claim 5, wherein one of the servomotors applies a pressure of about 3-4 bar to the mandrel.

8. The method of claim 1 further comprising the step of retracting the first striker after detabbing.

9. The method of claim 1 further comprising the step of retracting the second striker after cutting the hole.

10. The method of claim 1 further comprising the step of retracting the mandrel after folding the hook.

11. The method of claim 1 further comprising the step of guiding the first jaw and the second jaw around the bottle using bumpers.

12. The method of claim 1 wherein the need for downstream operations is avoided.

13. The method of claim 1 wherein about 40 bottles per minute are produced.

14. A method for producing a bottle in a single cycle using a multifunctional detabber apparatus, the bottle having a main body portion and a bottom surface having a hook projection integrally molded with and extending from the bottom surface in a deployed position and at least one locking channel molded into the bottom surface in order to receive and releasably secure the hook projection in a non-deployed position, the method comprising:
    inputting bottles to the multifunctional detabber apparatus from one or more upstream operations;
    supplying the bottles one at a time to the multifunctional detabber apparatus;
    closing first and second jaws of the multifunctional detabber apparatus to surround an outer periphery of the bottle and secure and prevent movement of the bottle;
    operating first and second strikers of the multifunctional detabber apparatus and optionally, a counter-striker of the multifunctional detabber apparatus to create an outer periphery of the hook projection and an opening in the hook projection;
    deploying a mandrel of the multifunctional detabber apparatus to close the hook projection and secure the hook projection in the at least one locking channel previously molded into the bottom surface of the bottle;
    opening the first and second jaws to release the bottle; and
    outputting the bottles.

15. The method of claim 14 wherein the bottles are supplied to the multifunctional detabber apparatus using a claw head of a spider tool.

16. The method of claim 14 wherein the first and second strikers are operated simultaneously.

17. The method of claim 14 further comprising operating each of the first jaw, the second jaw, the first striker, the second striker, and the mandrel using a plurality of pneumatic servomotors.

18. The method of claim 14 wherein the need for downstream operations is avoided.

19. The method of claim 14 wherein about 40 bottles per minute are produced.

20. A method for producing a bottle in a single cycle using a multifunctional detabber apparatus, the bottle having a main body portion and a bottom surface having a hook projection integrally molded with and extending from the bottom surface in a deployed position and at least one locking channel molded into the bottom surface in order to receive and releasably secure the hook projection in a non-deployed position, the method comprising:
    providing a plurality of bottles from an upstream operation;
    grabbing the bottles one at a time with a moveable first jaw and a moveable second jaw to secure the bottle and prevent movement of the bottle;

detabbing flash from around an outer periphery of the hook projection with a first striker against a counter-striker and simultaneously cutting a hole in the hook projection with a second striker against the counter-striker to create a hook;

retracting the first and second strikers;

folding the hook flush with the bottom surface of the bottle and into the at least one locking channel in the bottom surface of the bottle using a mandrel having an elongated shaft and extending to fold the hook;

retracting the mandrel; and releasing the bottle from the first and second jaws.

\* \* \* \* \*